US009652222B1

(12) United States Patent
Carle et al.

(10) Patent No.: US 9,652,222 B1
(45) Date of Patent: May 16, 2017

(54) PROTOTYPING APPARATUS WITH BUILT-IN PROGRAMMING FACILITY AND CORRESPONDING METHODS

(71) Applicant: Marvell International Ltd., Hamilton (BM)

(72) Inventors: Andrew Jacob Carle, San Jose, CA (US); Khin Zaw, Cupertino, CA (US); Chih-Hao Shih, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 14/924,357

(22) Filed: Oct. 27, 2015

Related U.S. Application Data

(60) Provisional application No. 62/079,307, filed on Nov. 13, 2014.

(51) Int. Cl.
G06F 9/44 (2006.01)
G06F 9/445 (2006.01)
G06F 9/54 (2006.01)

(52) U.S. Cl.
CPC ............ G06F 8/67 (2013.01); G06F 9/44505 (2013.01); G06F 9/54 (2013.01)

(58) Field of Classification Search
CPC ........... G06F 8/67; G06F 9/44505; G06F 9/54
See application file for complete search history.

(56) References Cited

U.S. PATENT DOCUMENTS

| 6,477,580 | B1 * | 11/2002 | Bowman-Amuah | ..... G06F 9/54 709/231 |
| 7,535,823 | B1 * | 5/2009 | Malhotra | ................. H04Q 3/66 370/216 |
| 2002/0162061 | A1 * | 10/2002 | Haroosh | ................ G11C 29/10 714/720 |
| 2003/0033588 | A1 * | 2/2003 | Alexander | ................ G06F 9/54 717/107 |
| 2007/0136453 | A1 * | 6/2007 | Ewing | ....................... G06F 1/26 709/223 |
| 2009/0183140 | A9 * | 7/2009 | Peck | ......................... G06F 8/34 717/113 |
| 2009/0287914 | A1 * | 11/2009 | Shah | ................... G06F 9/44505 713/1 |

(Continued)

Primary Examiner — Chameli Das

(57) ABSTRACT

A prototyping apparatus includes a housing, a connector on the housing for accepting a component, a microcontroller within the housing interacting with the component where the microcontroller has program memory, a user interface on an exterior surface of the housing for interaction between a user and the apparatus, a connection to a source of upgrade software, and programming circuitry within the housing for causing the microcontroller to enter an upgrade mode. The prototyping apparatus may further include a processor in communication with the microcontroller and the user interface, a device driver running on the processor for actuating the programming circuitry responsive to the command received through the user interface. The prototyping apparatus may include circuitry for generating a voltage that is higher than an operating voltage of the prototyping apparatus, and may further include level-shifting circuitry for shifting signals that are at the operating voltage to the higher voltage.

17 Claims, 4 Drawing Sheets

(56) References Cited

U.S. PATENT DOCUMENTS

| | | | |
|---|---|---|---|
| 2012/0030600 A1* | 2/2012 | Chandhoke | G06F 8/34 715/771 |
| 2013/0247019 A1* | 9/2013 | Xu | G06F 17/5054 717/168 |
| 2014/0223406 A1* | 8/2014 | Teller | A61B 5/01 717/100 |
| 2014/0249684 A1* | 9/2014 | Nickerson | A01G 25/16 700/284 |
| 2015/0102178 A1* | 4/2015 | Kovach, II | A63H 19/24 246/219 |
| 2016/0211672 A1* | 7/2016 | Naiknaware | H02M 7/4807 |

* cited by examiner

US 9,652,222 B1

PROTOTYPING APPARATUS WITH BUILT-IN PROGRAMMING FACILITY AND CORRESPONDING METHODS

CROSS REFERENCE TO RELATED APPLICATION

This disclosure claims the benefit of U.S. Provisional Patent Application No. 62/079,307, filed Nov. 13, 2014, which is hereby incorporated by reference in its entirety.

FIELD OF USE

This disclosure relates to prototyping systems of the type having a microcontroller and a user interface, which is used with external sensors or transducers or other input/output components provided in a form factor having a standard physical pin arrangement but whose pin assignments vary. More particularly, this disclosure relates to such a prototyping system having assignable pins.

BACKGROUND

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted to be prior art against the present disclosure.

Small electronic devices, such as those intended for consumer use, frequently incorporate microcontroller units (MCUs) that handle low-level tasks such as analog-to-digital conversion or controlling elements of a display. Typically, software run by such MCUs is permanently stored within read-only memory (ROM) of the MCU. Updating such software typically requires return of the device to its manufacturer, or a field service visit, to replace the ROM or the entire MCU. If the software is stored in rewritable memory, it may be possible to update the software without physically replacing the memory, but return of the unit or a field service visit, or purchase by the consumer of an expensive programming unit, may still be required.

SUMMARY

A prototyping apparatus includes a housing, a connector on the housing for accepting a component, a microcontroller within the housing for interacting with the component, the microcontroller having program memory, a user interface on an exterior surface of the housing for interaction between a user and the apparatus, a connection to a source of upgrade software, and programming circuitry within the housing for causing the microcontroller to enter an upgrade mode, responsive to a command received through the user interface, to load the upgrade software.

The prototyping apparatus may further include a processor in communication with the microcontroller and the user interface, a device driver running on the processor for actuating the programming circuitry responsive to the command received through the user interface. Such a device driver may include a command to activate the programming circuitry to cause the microcontroller to enter the upgrade mode, a command to activate the programming circuitry to cause the microcontroller to exit the upgrade mode, a command to read a configuration register of the microcontroller, a command to write a configuration register of the microcontroller, a command to read the program memory of the microcontroller, and a command to write the program memory of the microcontroller.

The prototyping apparatus may include circuitry for generating a voltage that is higher than an operating voltage of the prototyping apparatus, and may further include level-shifting circuitry for shifting signals that are at the operating voltage to the higher voltage.

A method of operating such a prototyping apparatus includes connecting the prototyping apparatus to a source of upgrade software, and activating the internal programming circuitry to enter the upgrade mode. That activating may include issuing a command from the user interface, or invoking a device driver on the processor, where the device driver includes a command to activate the programming circuitry to cause the microcontroller to enter the upgrade mode, a command to activate the programming circuitry to cause the microcontroller to exit the upgrade mode, a command to read a configuration register of the microcontroller, a command to write a configuration register of the microcontroller, a command to read the program memory of the microcontroller, and a command to write the program memory of the microcontroller.

The activating may include generating a voltage that is higher than an operating voltage of the prototyping apparatus, and may further include level-shifting signals that are at the operating voltage to the higher voltage.

BRIEF DESCRIPTION OF THE DRAWINGS

Further features of the disclosure, its nature and various advantages, will be apparent upon consideration of the following detailed description, taken in conjunction with the accompanying drawings, in which like reference characters refer to like parts throughout, and in which.

DETAILED DESCRIPTION

One type of small electronic device as described above may be a prototyping unit for small devices, including, but not limited to, for example, devices that may be connected to the "Internet-of-Things." To facilitate prototyping of systems using small components in conjunction with a microcontroller, a prototyping apparatus, including a microcontroller and a user interface, as well as input/output terminals, may be provided. Among the input/output terminals may be a set of terminals that can accept the pins of a breakout board or similar structure bearing the component.

As noted above, the small components may include sensors, motors and servos, as well as indicators such as lights (including light-emitting diodes) or other optical transducers, or aural transducers (speakers, buzzers, etc.), or other hardware components. In accordance with implementations of subject matter described in this disclosure, a prototyping device may be provided with one or more sets of terminals that can accept one or more of such components. The prototyping device includes a processor or microcontroller unit for interacting with the component. That processor or microcontroller unit also may control the user interface and other functions of the prototyping device, or another, separate processor or microcontroller unit may be provided for that purpose.

Figure 1:
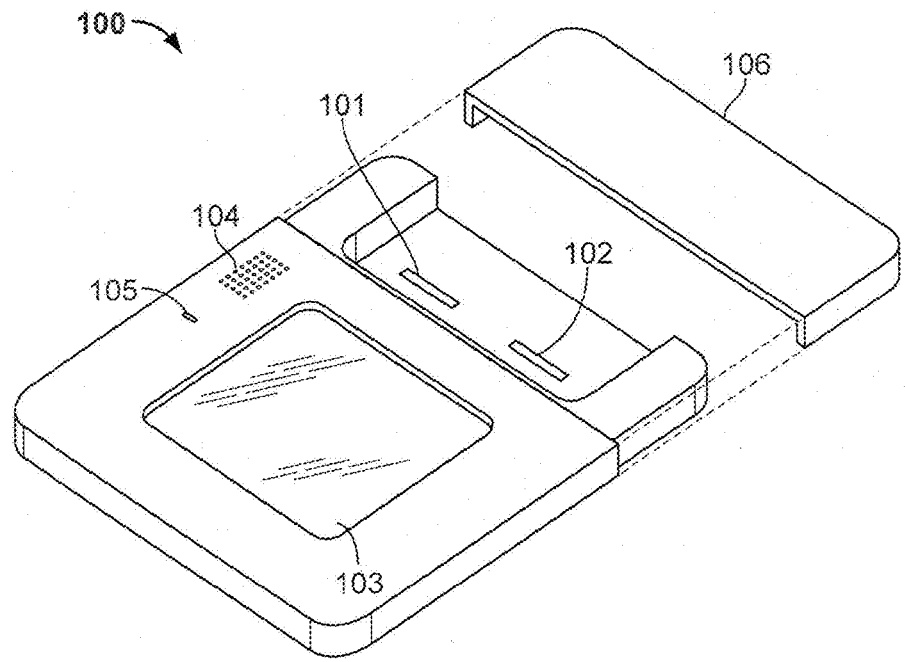
FIG. 1 shows an example of a prototyping device according to an implementation described in this disclosure.

One example of such a prototyping device 100 according to an implementation of subject matter described in this disclosure is shown in FIG. 1. As seen in FIG. 1, prototyping device 100 includes a housing having two slots 101, 102 in its exterior surface, each of which can accept a small component mounted on small-form-factor circuit board known as a "breakout board." In this example, each slot 101, 102 reveals a connector that can accept up to eight pins. Prototyping device 100 also has a microprocessor or microcontroller internal to the housing of prototyping device 100 (and therefore not visible in FIG. 1), and a touchscreen input/output display 103, a speaker 104 and a microphone 105.

Although not illustrated in FIG. 1, other terminals, connectors and controls may be present on other surfaces of the housing of prototyping device 100. For example, there may be a power switch, as well as volume controls for speaker 104 and/or microphone 105, and brightness and/or contrast controls for display 103. Other terminals or connectors may include a power supply input, as well as terminals or connectors for connection to a larger device (e.g., a personal computer) or to a communications network (e.g., the Internet). In some implementations, the terminals in one or more of slots 101, 102 may be replicated or duplicated on another surface of the housing of prototyping device 100 (e.g., as part of a larger group of terminals including the other terminals or connectors described above). Cover 106 may be provided to enclose any breakout boards that are inserted in slots 101, 102 to prevent damage to, or dislodging of, the breakout boards, and to give a finished appearance to the prototype being implemented.

The microcontroller may be any suitable microcontroller. Some examples of suitable microcontrollers include a microcontroller from the PIC16 family of PIC® microcontrollers available from Microchip Technology Inc., of Chandler, Ariz., an ARM®-based microprocessor licensed from ARM Holdings plc, of Cambridge, England, or a microcontroller based on the Arduino® open-source architecture, among others. In some implementations, the microcontroller should be able to simulate or emulate the various data exchange protocols that might be used by a component, including digital and analog protocols. One example is the Inter-Integrated Circuit protocol (which also is commonly known as $I^2C$, I2C or IIC).

Microcontrollers typically include program memory, either as a separate chip, or as integrated on-die memory. As noted above, if the program memory is not rewritable, changing the microcontroller memory would require changing the memory chip in the case of a circuit-board microcontroller, or changing the entire microcontroller in the case of an integrated on-die microcontroller.

However, if the program memory is rewritable, then the microcontroller can be reprogrammed without replacing any components. Nevertheless, typically it is necessary to apply special signals to certain inputs to enter the reprogramming mode. To conserve input/output pins, separate programming pins typically are not required. Rather, pins that in normal use have other functions are used for reprogramming. This may be accomplished by applying a particular input (e.g., a defined but abnormally high voltage, either continuously or in a predetermined pattern) to one of those pins, which would then put the device into programming mode, in which various pins that ordinarily are used for other functions would be used for programming data and control of the programming process.

Because of the need to provide special signals, even though component replacement is not required when the program memory is rewritable, reprogramming a microcontroller still requires a service visit by a technician with an external programmer device that can apply the special signals. While a sophisticated user might be able to carry out the process without a technician, the cost of the external programmer device may deter users from performing reprogramming themselves.

Therefore, in accordance with implementations of subject matter described in this disclosure, circuitry is added to prototyping device 100 to take the place of an external programmer. In some implementations, software also may be added to prototyping device 100 as part of such an implementation.

Figure 2:
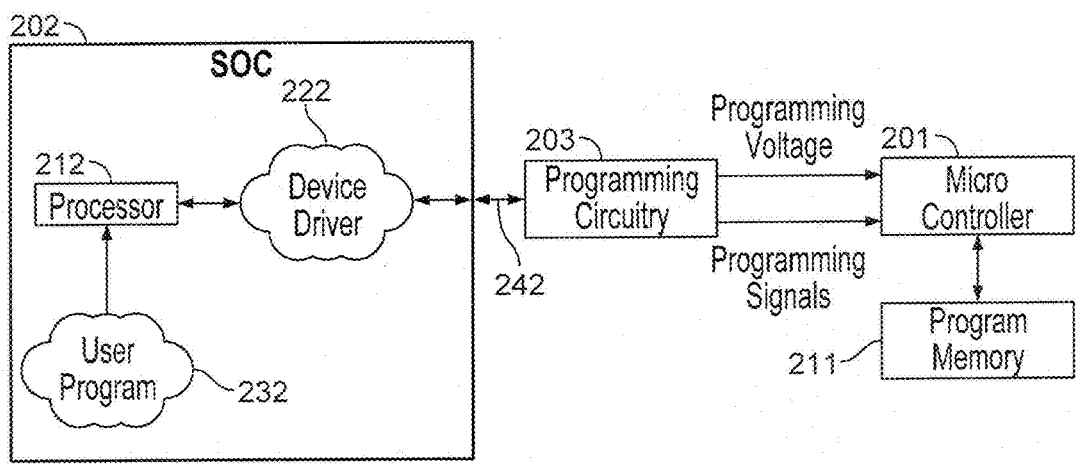
FIG. 2 shows a system architecture according to an implementation described in this disclosure.

A general architecture 200 of such an implementation, which includes the microcontroller 201 to be reprogrammed, a system-on-chip 202, and the circuitry that is added to take the place of an external programmer, is shown in FIG. 2. It should be understood that microcontroller 201 may include more than one microcontroller. As shown in FIG. 2, program memory 211 for microcontroller 201 is separate from microcontroller 201. However, it should be understood that microcontroller 201 and program memory 211 can be implemented as a single chip.

System-on-chip (SoC) 202 may include a separate processor 212 for controlling the user interface of device 100, as well as the reprogramming methods and circuitry described herein. There may be connections between system-on-chip 202 and microcontroller 201 beyond those shown in FIG. 2; a portion of those connections may be used for programming circuitry 203.

Figure 3:
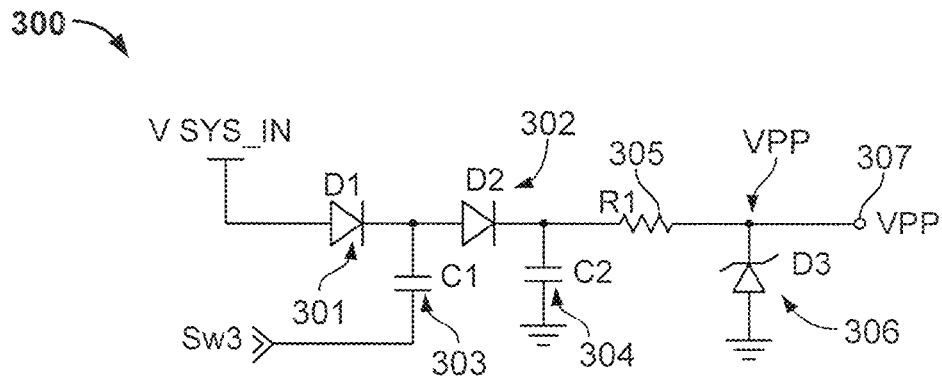
FIG. 3 shows a power supply circuit according to an implementation described in this disclosure.
Figure 4:
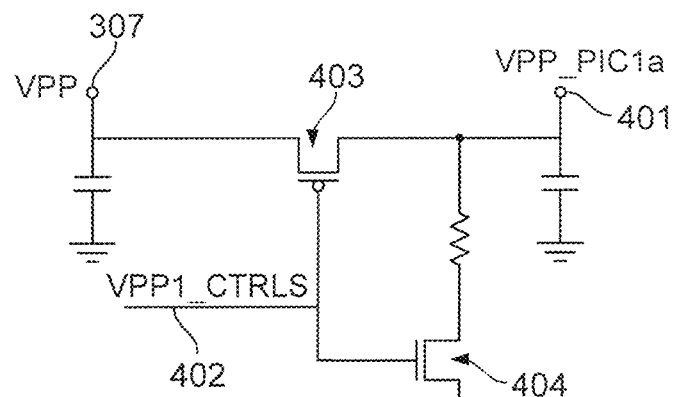
FIG. 4 shows a power delivery circuit according to an implementation described in this disclosure.
Figure 5:
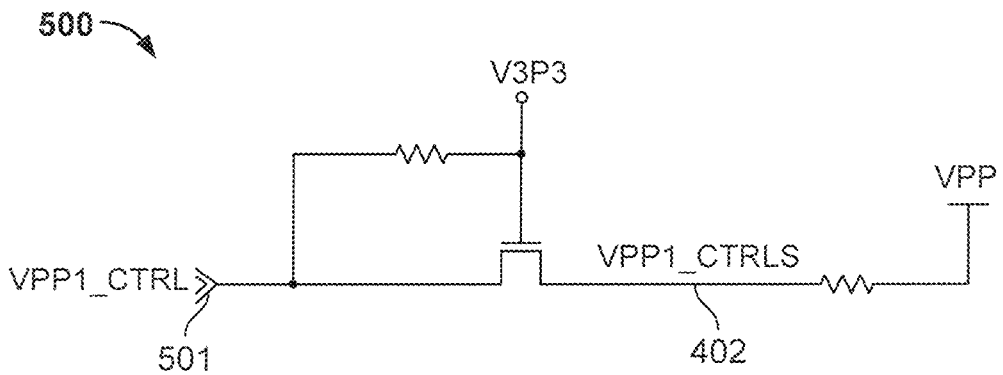
FIG. 5 shows a level shifting circuit according to an implementation described in this disclosure.

Programming circuitry 203 is the aforementioned circuitry that is added to prototyping device 100 to take the place of an external programmer, and includes circuitry for generating and applying the aforementioned special programming voltage. FIGS. 3-5 show various circuits that may be included in programming circuitry 203.

FIG. 3 shows an example of a power circuit 300 for delivering the abnormally high voltage described above. For example, diodes D1 301 and D2 302, along with capacitor C1 303, form a voltage doubler. In the example where the normal operating voltage VSYS_IN of prototyping device 100 is about 5 volts, the doubled voltage is about 9.5 volts. Capacitor C2 304 smoothes the doubled voltage. Resistor R1 305 and diode D3 306 regulate the doubled voltage down to VPP 307; VPP≈8.5 volts.

FIG. 4 shows an example of a power-switching circuit 400 that accepts voltage 307 input from power circuit 300, and outputs that voltage at terminal 401 (VPP_PIC1a) to the programming control terminal of microcontroller 201, under the control of a signal 402 (VPP1_CTRLS) from system-on-chip 202. When signal 402 is low, voltage 306 (e.g., VPP=8.5V) is output at terminal 401, and when signal 402 is high, 0V is output at terminal 401.

FIG. 4 assumes that transistors 403, 404 operate using VPP signaling voltages (for example, 8.5V signaling). As noted above, system-on-chip 202 operates at a lower voltage (e.g., 3.3V, although 5V operation also is possible). Thus, level-shifting circuit 500 of FIG. 5 is used to shift 3.3V signals from system-on-chip 202 to 8.5V levels. As seen, control signal 501 (VPP1_CTRL) is input on the V3P3 side (3.3V) of circuit 500 and is output as signal 402 (VPP1_CTRLS) on the VPP side (8.5V) of circuit 500. However, level-shifting circuit 500 is optional, and power-switching circuit 400 could operate using 3.3V signaling, in which case control signal 402 would be signal VPP1_CTRL directly from system-on-chip 202, rather than signal VPP1_CTRLS. Similar level-shifting circuits (not shown) may be used for clock and data signals 242.

With circuitry 203 in place, implementations of subject matter described in this disclosure also may include a device driver 222 (which can be implemented in software, firmware, hardware, or any combination thereof) to allow processor 212 to use circuitry 203. Specifically, device driver 222 in accordance with this disclosure may include the correct data formats for entering and exiting the programming mode, reading and writing the configuration register, and reading and writing program memory 211 of microcontroller 201. Device driver 222 may be created in some implementations as a Linux kernel. In one implementation, device driver 222 uses three general-purpose input/output pins of processor 212 and microcontroller 201 to accomplish these functions.

Figure 6:
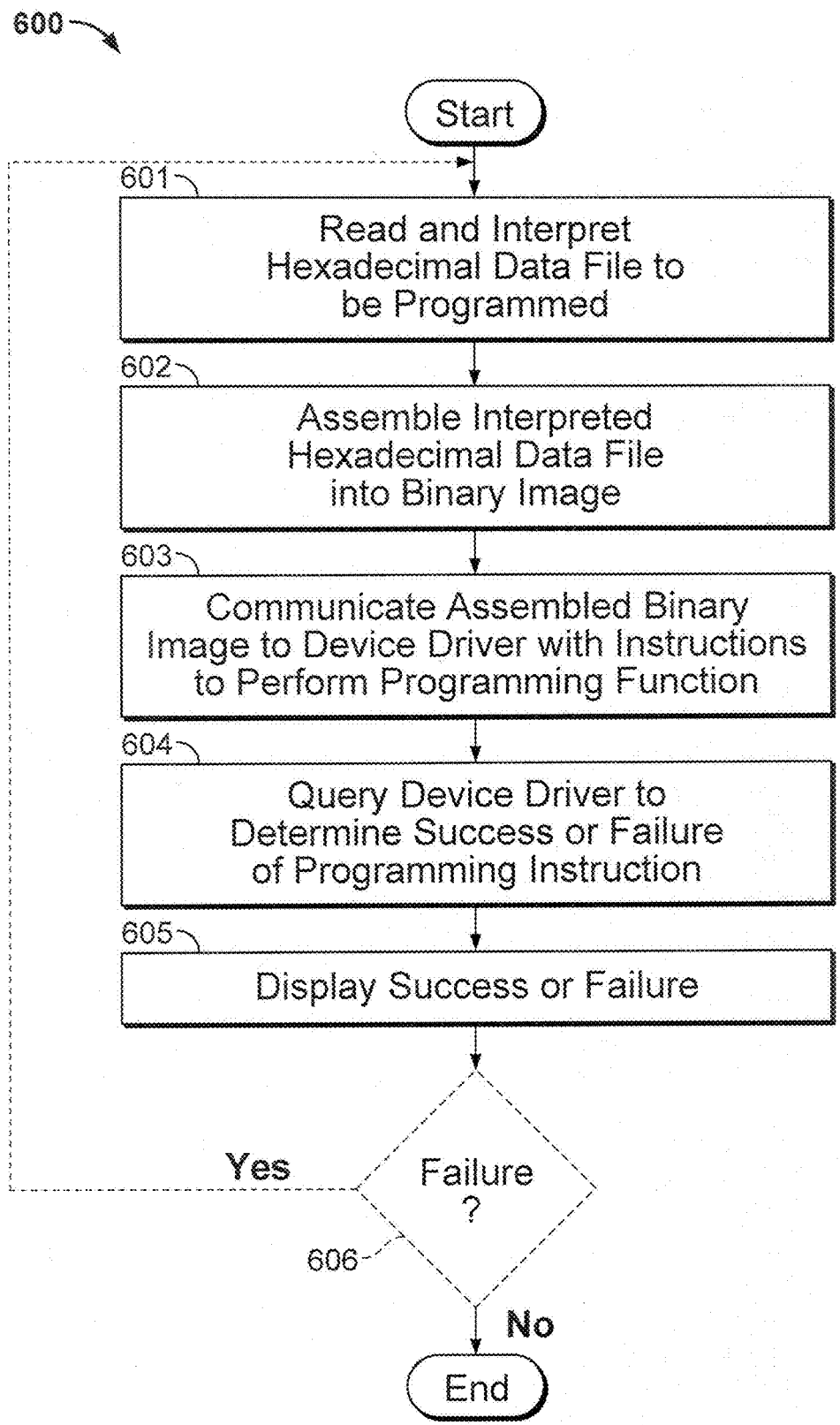
FIG. 6 is a flow diagram of a method according to an implementation described in this disclosure.

The user may interact with the device driver using a user-level program 232 running on processor 212. The user-level program 232 may be invoked by touching an "Upgrade" button (not shown) on touchscreen 103. One implementation 600 of such a program, which implements method for performing a software upgrade is illustrated in the flow diagram in FIG. 6. Method 600 may be implemented in software, firmware, hardware, or any combination thereof. At 601, a data file to be programmed is read and interpreted. The data file, which may be encoded in hexadecimal format, may be downloaded from an external network such as the Internet, using a wired or wireless connection 220, or may be provided to the user on a tangible external storage medium that can, e.g., plug into one of the terminals or connectors on device 100 that are referred to above, but not shown, in connection with FIG. 1.

At 602, the interpreted hexadecimal file is assembled into a binary image, and at 603, the binary image is communicated to the device driver with instructions to perform the programming function. At 604, the device driver is queried to verify success or failure, and at 605 the success or failure is displayed on touchscreen 103. If the result was a failure, method 600 optionally may be invoked again by the user, as indicated at 606, and would begin again.

Figure 7:
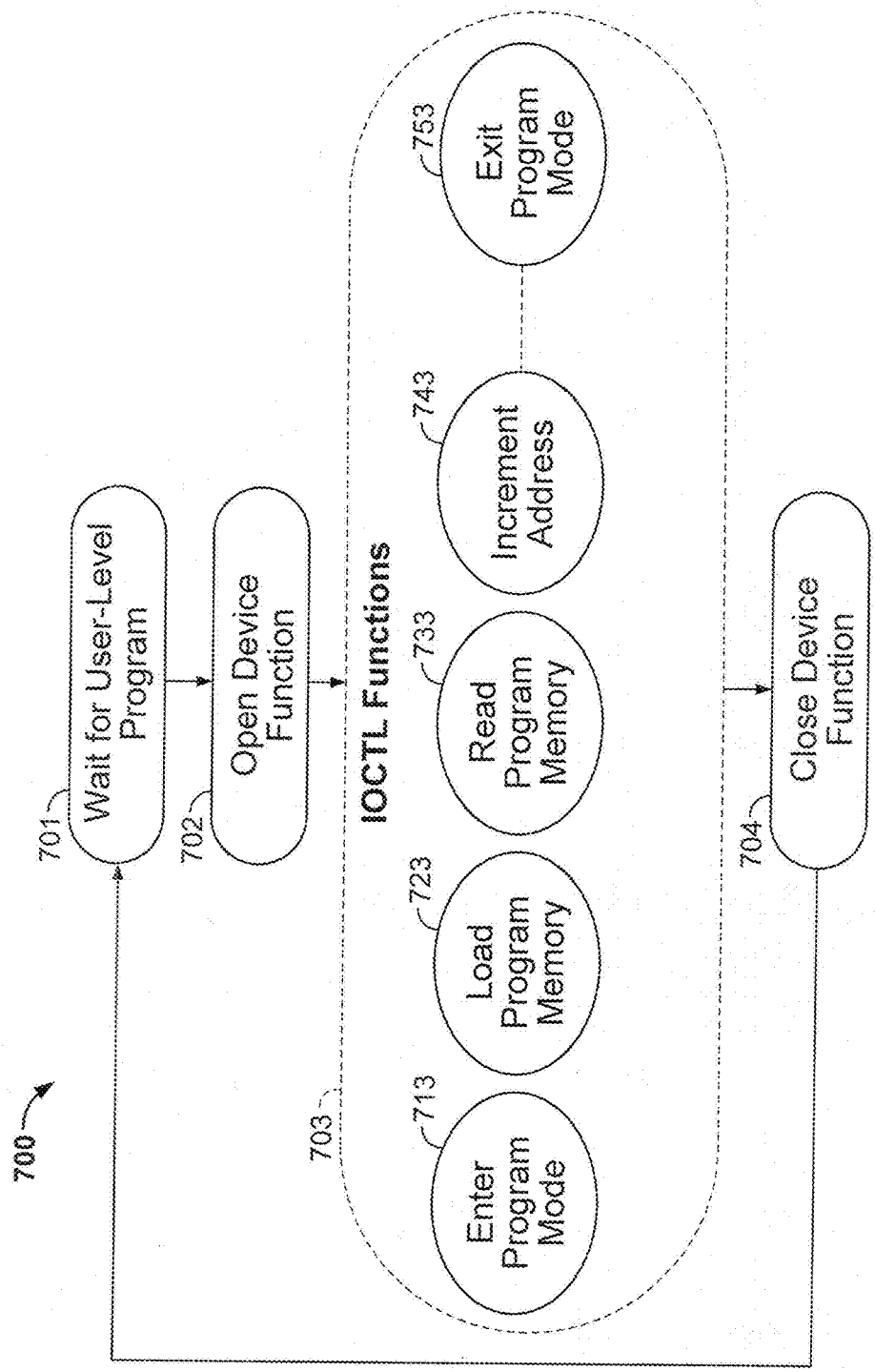
FIG. 7 is a state diagram of a device driver according to an implementation described in this disclosure.

A state diagram of an implementation 700 of device driver 222 is shown in FIG. 7. As noted above, device driver 222 is accessed by user-level program 232. In implementation 700, device driver 222 waits at 701 for a command from user-level program 232. Upon receipt of such a command, at 702 device driver 222 opens the appropriate device function from among input/output control (IOCTL) functions 703. IOCTL functions 703 may include entering the programming mode 713, loading (e.g., writing) the program memory 723 (e.g., program memory 211 of microcontroller 2010, reading the program memory 733 (e.g., program memory 211 of microcontroller 201), incrementing the address 743 for sending commands, and exiting the programming mode 753, as well as other functions (not shown) such as reading and writing the configuration register (as noted above). Upon completion of the IOCTL function, device driver 222 closes the function at 704 and returns to state 701 to await another instruction from user-level program 232.

It will be understood that the foregoing is only illustrative of the principles of the invention, and that the invention can be practiced by other than the described embodiments, which are presented for purposes of illustration and not of limitation, and the present invention is limited only by the claims which follow.

What is claimed is:

1. A prototyping apparatus comprising:
   a housing;
   a connector on the housing for accepting a component;
   a microcontroller within the housing for interacting with the component to facilitate prototyping of a system that uses the component, the microcontroller having program memory;
   a user interface on an exterior surface of the housing for interaction between a user and the apparatus;
   a connection to a source of upgrade software;
   programming circuitry within the housing for causing the microcontroller to enter an upgrade mode, responsive to a command received through the user interface, to load the upgrade software;
   a processor in communication with the microcontroller and the user interface; and
   a device driver running on the processor for actuating the programming circuitry responsive to the command received through the user interface; wherein:
   the processor executes user software, the user software including:
   commands to read and interpret the upgrade software,
   commands to assemble a binary image from the upgrade software, and
   commands to communicate with the device driver to actuate the programming circuitry to load the binary image into the program memory of the microcontroller.

2. The prototyping apparatus of claim 1, wherein the device driver includes:
   a command to activate the programming circuitry to cause the microcontroller to enter the upgrade mode;
   a command to activate the programming circuitry to cause the microcontroller to exit the upgrade mode;
   a command to read a configuration register of the microcontroller;
   a command to write a configuration register of the microcontroller;
   a command to read the program memory of the microcontroller; and
   a command to write the program memory of the microcontroller.

3. The prototyping apparatus of claim 1, wherein the programming circuitry comprises circuitry for generating a voltage that is higher than an operating voltage of the prototyping apparatus.

4. The prototyping apparatus of claim 3, wherein the programming circuitry further comprises level-shifting circuitry for shifting signals at the operating voltage to the higher voltage.

5. The prototyping apparatus of claim 1, wherein the connection to a source of upgrade software comprises a connection to an external data network.

6. The prototyping apparatus of claim 5, wherein the connection to the external data network is a wired connection.

7. The prototyping apparatus of claim 6, wherein the connection to the external data network is a wireless connection.

8. The prototyping apparatus of claim 1, wherein the connection to the source of upgrade software comprises a connection to an external storage medium.

9. A method of upgrading prototyping apparatus that includes (i) a housing, (ii) a connector on the housing for accepting a component, (iii) a microcontroller within the housing for interacting with the component to facilitate prototyping of a system that uses the component, the microcontroller having program memory, (iv) a user interface on an exterior surface of the housing for interaction between a user and the apparatus, (v) internal programming circuitry for causing the microcontroller to enter and exit an upgrade mode, (vi) a processor in communication with the microcontroller and the user interface, and (vii) a device driver running on the processor for actuating the programming circuitry responsive to a command received through the user interface; the method comprising:
- connecting the prototyping apparatus to a source of upgrade software;
- activating the internal programming circuitry to enter the upgrade mode;
- executing user software on the processor, the user software including:
- commands to read and interpret the upgrade software;
- commands to assemble a binary image from the upgrade software; and
- commands to communicate with the device driver to actuate the programming circuitry to load the binary image into the program memory of the microcontroller.

10. The method of claim 9, wherein the activating comprises issuing a command from the user interface.

11. The method of claim 9, wherein the activating comprises invoking the device driver on the processor, the device driver including:
- a command to activate the programming circuitry to cause the microcontroller to enter the upgrade mode;
- a command to activate the programming circuitry to cause the microcontroller to exit the upgrade mode;
- a command to read a configuration register of the microcontroller;
- a command to write a configuration register of the microcontroller;
- a command to read the program memory of the microcontroller; and
- a command to write the program memory of the microcontroller.

12. The method of claim 9, wherein the activating comprises generating a voltage that is higher than an operating voltage of the prototyping apparatus.

13. The method of claim 12, wherein the activating further comprises level-shifting signals at the operating voltage to the higher voltage.

14. The method of claim 9, wherein the connecting comprises connecting to an external data network.

15. The method of claim 14, wherein the connecting comprises making a wired connection.

16. The method of claim 14, wherein the connecting comprises making a wireless connection.

17. The method of claim 9, wherein the connecting comprises connecting to an external storage medium.

* * * * *